US010219615B2

(12) United States Patent
Iacoviello

(10) Patent No.: US 10,219,615 B2
(45) Date of Patent: Mar. 5, 2019

(54) HANDS FREE READING ASSEMBLY

(71) Applicant: John Iacoviello, Sonoma, CA (US)

(72) Inventor: John Iacoviello, Sonoma, CA (US)

( * ) Notice: Subject to any disclaimer, the term of this patent is extended or adjusted under 35 U.S.C. 154(b) by 532 days.

(21) Appl. No.: 14/992,055

(22) Filed: Jan. 11, 2016

(65) Prior Publication Data

US 2017/0196353 A1    Jul. 13, 2017

(51) Int. Cl.
    *A47B 23/00* (2006.01)
(52) U.S. Cl.
    CPC .................. *A47B 23/002* (2013.01)
(58) Field of Classification Search
    CPC ............................ B60R 11/02; A47B 23/002
    USPC ....... 224/188, 257, 258, 265, 201, 270, 600, 224/603; 248/441.1
    See application file for complete search history.

(56) References Cited

U.S. PATENT DOCUMENTS

| | | | | | |
|---|---|---|---|---|---|
| 1,542,163 | A | * | 6/1925 | Morde | A45F 3/14 108/43 |
| 2,304,705 | A | * | 12/1942 | Pate | A47G 23/06 108/135 |
| 3,090,330 | A | * | 5/1963 | Best | A45F 5/00 108/135 |
| 3,283,971 | A | * | 11/1966 | Jones | B44D 3/121 224/148.7 |
| 3,541,976 | A | * | 11/1970 | Rozas | A47B 23/002 108/43 |
| D290,785 | S | * | 7/1987 | Kelly | 224/603 |
| 4,915,278 | A | * | 4/1990 | Smith | A45F 3/02 224/236 |
| 5,062,558 | A | * | 11/1991 | Stang | A41B 13/103 2/49.2 |
| 5,551,615 | A | * | 9/1996 | McIntosh | A45F 5/00 224/250 |
| 5,639,004 | A | * | 6/1997 | Carlton | A45C 9/00 190/125 |
| 5,724,225 | A | * | 3/1998 | Hrusoff | A45F 3/14 206/305 |
| 5,806,734 | A | * | 9/1998 | Scott | F16M 13/04 224/255 |
| 5,813,354 | A | * | 9/1998 | Scott | B60N 3/004 108/44 |
| 5,938,096 | A | | 8/1999 | Sauer et al. | |
| 7,780,049 | B1 | | 8/2010 | Baranoski | |
| 8,157,137 | B1 | * | 4/2012 | Laird | A45F 3/14 108/43 |
| 8,418,629 | B2 | * | 4/2013 | Yu | A45F 5/00 108/43 |
| 8,418,900 | B1 | * | 4/2013 | Baker | A45F 5/00 224/262 |
| 8,490,846 | B1 | * | 7/2013 | Wheatley | B60R 11/02 224/277 |

(Continued)

FOREIGN PATENT DOCUMENTS

WO    WO2012151200    11/2012

*Primary Examiner* — Nathan J Newhouse
*Assistant Examiner* — Lester L Vanterpool

(57) ABSTRACT

A hands free reading assembly includes a box that may be positioned on a chest of a user while the user is seated. The box may have an object positioned thereon thereby facilitating the object to be visible to the user. A stand is removably coupled to the box and the stand may retain the object in an upright position. A hoop is hingedly coupled to the box and the hoop may be positioned around a neck of the user. Thus, the box is retained on the user's chest.

8 Claims, 6 Drawing Sheets

(56) References Cited

U.S. PATENT DOCUMENTS

| | | | |
|---|---|---|---|
| 8,807,406 B1* | 8/2014 | Thach | A45F 5/00 224/153 |
| 8,844,448 B2* | 9/2014 | Allen | A47B 23/002 108/43 |
| 8,881,961 B1* | 11/2014 | Cibirka | A45F 5/00 2/268 |
| 9,375,073 B2* | 6/2016 | Orr, Jr. | A45F 5/00 |
| 2004/0211799 A1* | 10/2004 | Loughman | F16M 13/04 224/262 |
| 2007/0051766 A1 | 3/2007 | Spencer | |
| 2007/0164987 A1* | 7/2007 | Graham | A45F 5/00 345/156 |
| 2013/0214022 A1* | 8/2013 | Harvey | F16M 11/041 224/623 |
| 2014/0216306 A1 | 8/2014 | Allen et al. | |
| 2015/0034685 A1* | 2/2015 | Mak | F16M 13/04 224/257 |

\* cited by examiner

HANDS FREE READING ASSEMBLY

BACKGROUND OF THE DISCLOSURE

Field of the Disclosure

The disclosure relates to reading devices and more particularly pertains to a new reading device for facilitating hands free reading.

SUMMARY OF THE DISCLOSURE

An embodiment of the disclosure meets the needs presented above by generally comprising a box that may be positioned on a chest of a user while the user is seated. The box may have an object positioned thereon thereby facilitating the object to be visible to the user. A stand is removably coupled to the box and the stand may retain the object in an upright position. A hoop is hingedly coupled to the box and the hoop may be positioned around a neck of the user. Thus, the box is retained on the user's chest.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
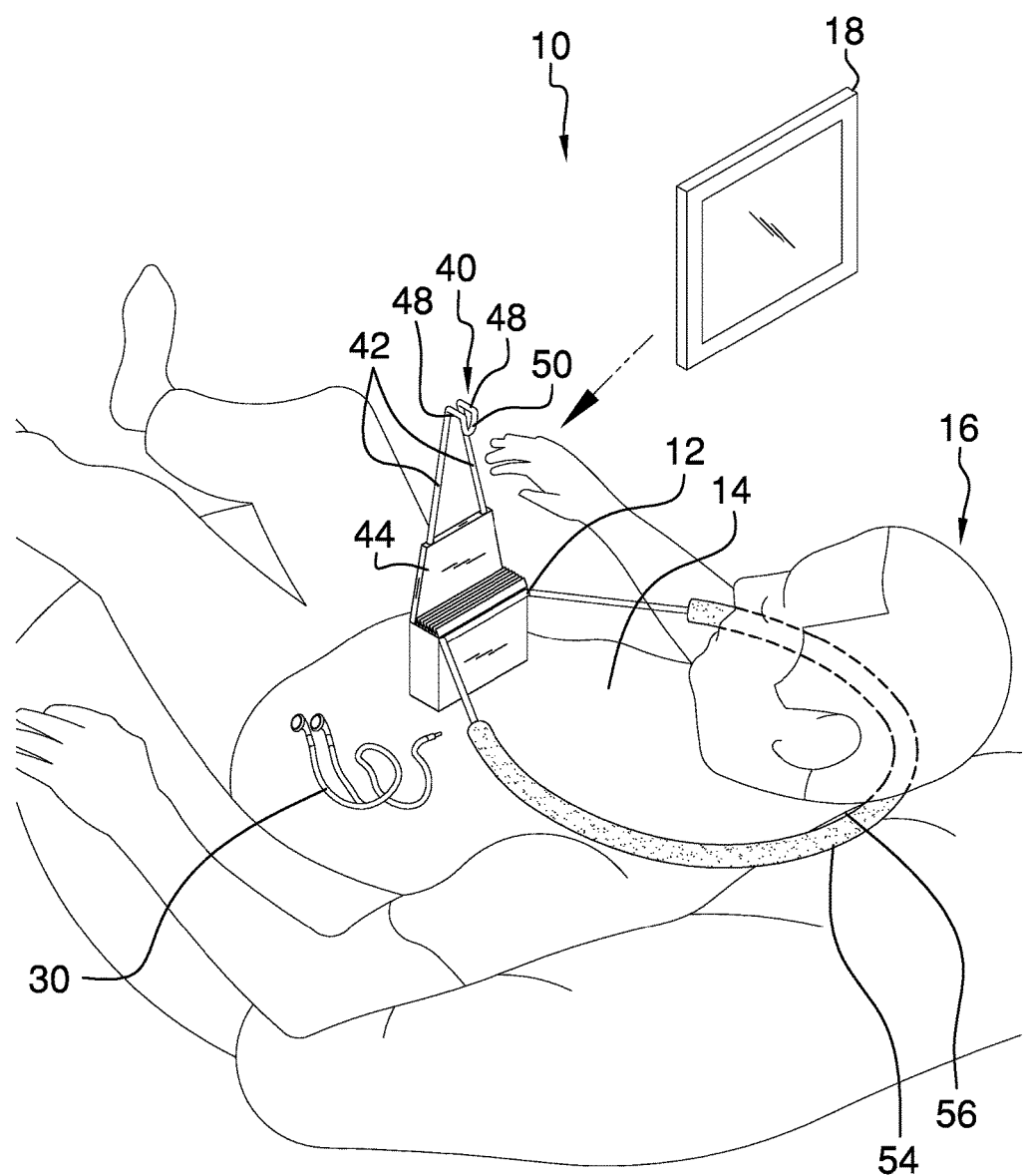
FIG. 1 is a perspective in-use view of a hands free reading assembly according to an embodiment of the disclosure.
Figure 2:
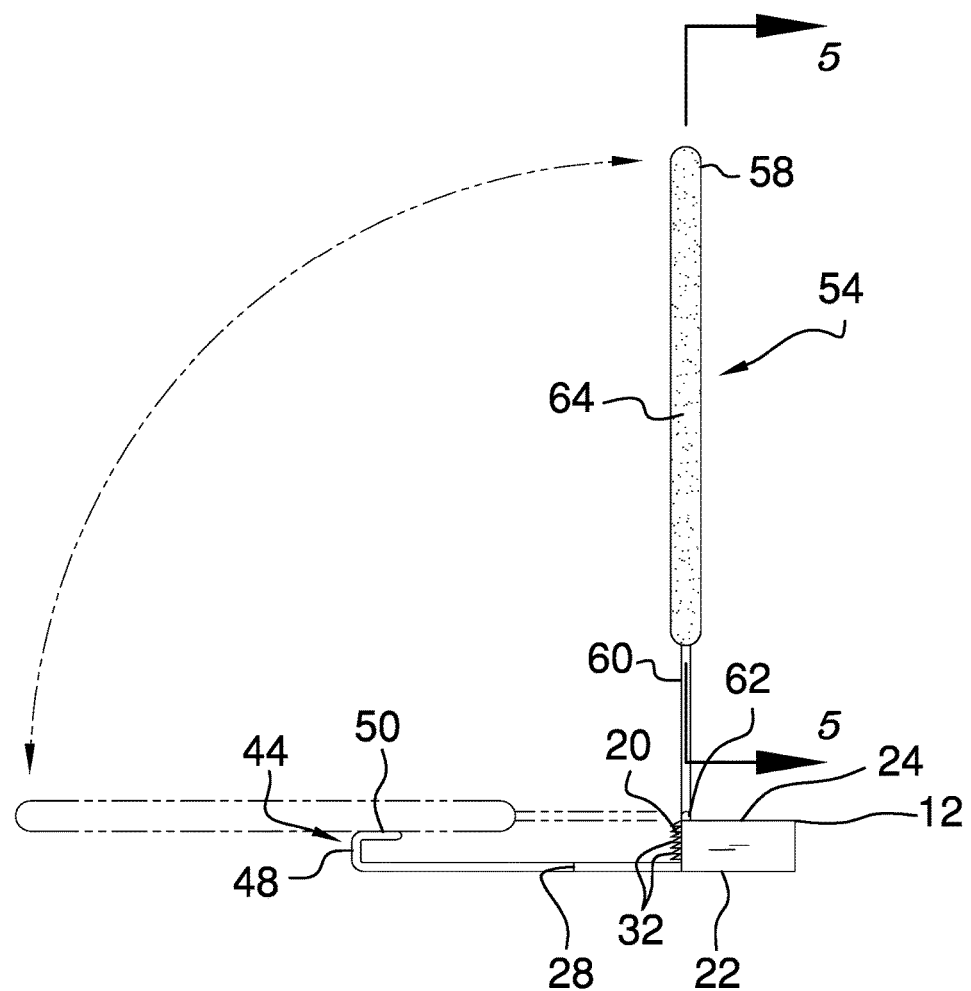
FIG. 2 is a right side view of an embodiment of the disclosure.
Figure 3:
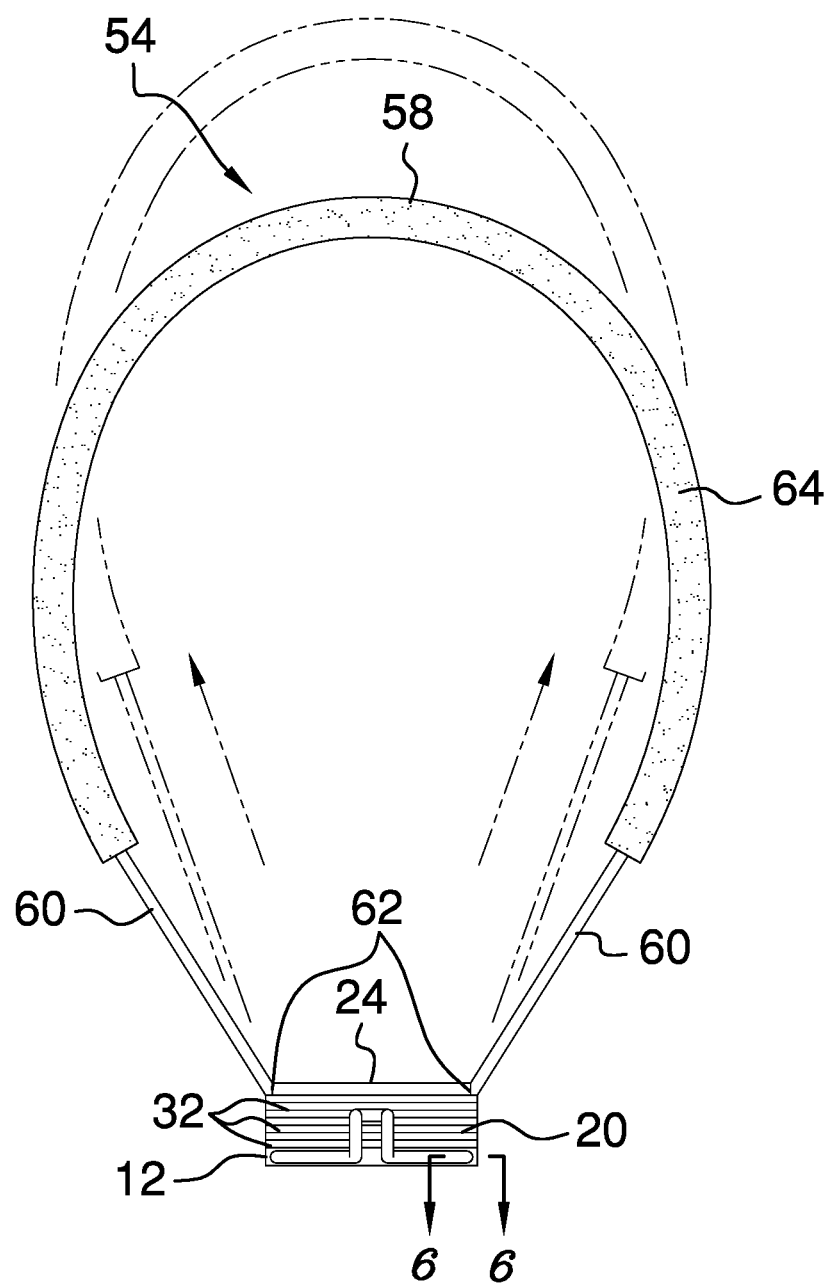
FIG. 3 is a top view of an embodiment of the disclosure.
Figure 4:
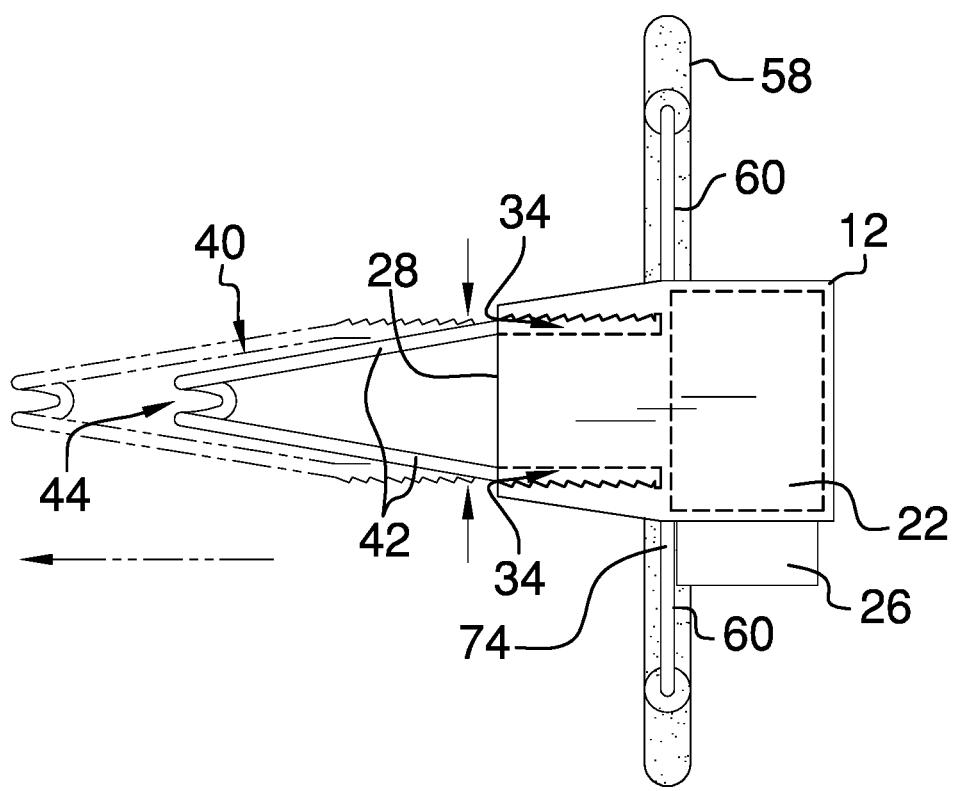
FIG. 4 is a back view of an embodiment of the disclosure.
Figure 5:
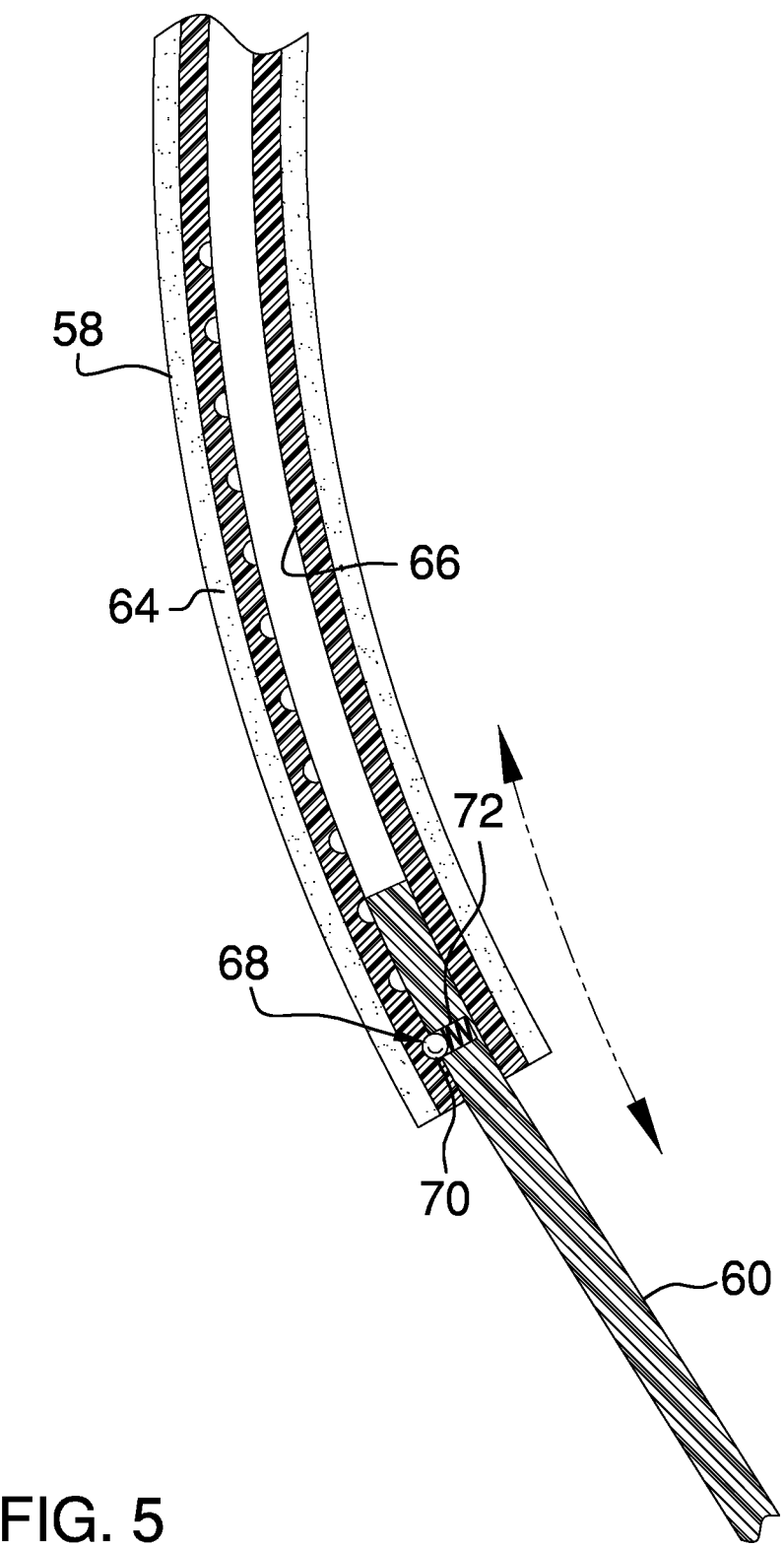
FIG. 5 is a cross sectional view taken along line 5-5 of figure of an embodiment of the disclosure.
Figure 6:
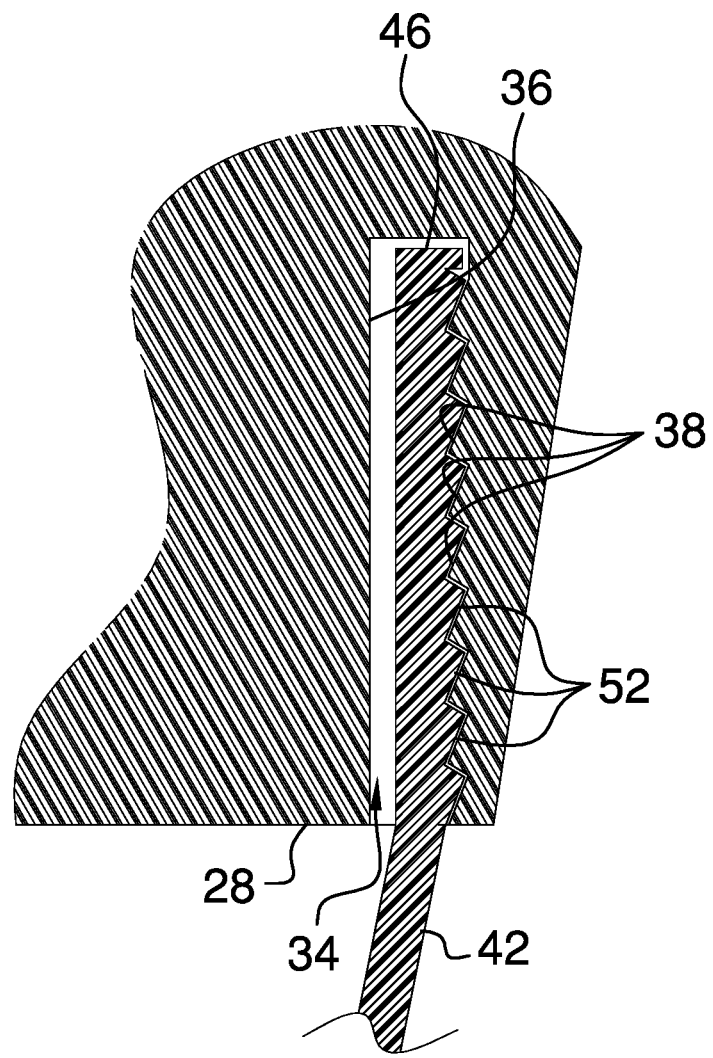
FIG. 6 is a cross sectional view taken along line 6-6 of FIG. 3 of an embodiment of the disclosure.

With reference now to the drawings, and in particular to FIGS. 1 through 6 thereof, a new reading device embodying the principles and concepts of an embodiment of the disclosure and generally designated by the reference numeral 10 will be described.

As best illustrated in FIGS. 1 through 6, the hands free reading assembly 10 generally comprises a box 12 that may be positioned on a chest 14 of a user 16 while the user 16 is seated. The box 12 may have an object 18 positioned thereon thereby facilitating the object 18 to be visible to the user 16. The object 18 may comprise a book, a Kindle or other substantially rectangular object utilized in the convention of reading.

The box 12 has a top wall 20, a back wall 22, a front wall 24 and a first lateral wall 26. The back wall 22 extends upwardly beyond the top wall 20. The back wall 22 has a distal edge 28 with respect to the top wall 20. The first lateral wall 26 is substantially open to access an interior of the box 12 such that the box 12 may store items 30.

The top wall 20 may have the object 18 positioned thereon such the back wall 22 retains the object 18 in an upright position. The top wall 20 comprises a plurality of ridges 32 that are spaced apart from each other and distributed between the back wall 22 and the front wall 24. The object 18 frictionally engages the ridges 32 when the object 18 is positioned on the box 12. Thus, the object 18 is inhibited from sliding on the top wall 20. The front wall 24 faces the user 16 when the box 12 is positioned on the user's chest 14.

The distal edge 28 has a pair of wells 34 extending toward the top wall 20. The wells 34 are spaced apart from each other. Each of the wells 34 has a bounding surface 36. The bounding surface 36 of each of the wells 34 is textured to define a plurality of grips 38 extending along each of the wells 34.

A stand 40 is removably coupled to the box 12 and the stand 40 retains the object 18 in an upright position. The stand 40 comprises a pair of legs 42 and a central portion 44 extending between the legs 42. The legs 42 are spaced apart from each other and each of the legs 42 has a distal end 46 with respect to the central portion 44. The central portion 44 includes a pair of arms 48 and a loop 50 extending between the arms 48. The arms 48 are spaced apart from each other and each of the arms 48 is oriented perpendicular with respect to an associated one of the legs 42.

The loop 50 is spaced from each of the legs 42 and the loop 50 is oriented parallel to each of the legs 42. Each of the legs 42 has a plurality of teeth 52 extending outwardly therefrom. The distal end 46 of each of the legs 42 is removably insertable into an associated one of the wells 34. Thus, each of the arms 48 is spaced from the top wall 20 of the box 12.

Each of the legs 42 is biased outwardly with respect to the central portion 44. Thus, the teeth 52 on the associated leg 42 engage the grips 38 in the associated well 34. Each of the legs 42 is retained at a selected point within each of the wells 34. The arms 48 are spaced a selected distance from the top wall 20 of the box 12. Thus, each of the arms 48 may frictionally engage the object 18 thereby retaining the object 18 on the box 12. The loop 50 may frictionally engage the object 18 thereby inhibiting the object 18 from falling forwardly with respect to the back wall 22 of the box 12.

A hoop 54 is hingedly coupled to the box 12 and the hoop 54 may be positioned around a neck 56 of the user 16 hereby facilitating the box 12 to be retained on the user's chest 14. The hoop 54 comprises a central portion 58 and a pair of end portions 60. Each of the end portions 60 is slidably coupled to the central portion 58 and each of the end portions 60 has a distal end 62 with respect to the central portion 58. The central portion 58 has an outer layer 64 and the outer layer 64 is comprised of a resiliently compressible material. Thus, the outer layer 64 enhances comfort of the central portion 58.

The distal end 62 corresponding to each of the end portions 60 is hingedly coupled to the front wall 24 of the box 12. Thus, the hoop 54 is positionable at a selected angle with respect to the front wall 24. The central portion 58 is curved between each of the end portions 60. Thus, the hoop 54 forms a closed loop.

The central portion 58 has an inner surface 66 and the central portion 58 is substantially hollow. Each of the end portions 60 includes a lock 68. The lock 68 corresponding to each of the end portions 60 frictionally engages the inner surface 66 at a selected point. Thus, the central portion 58 is spaced a selected distance from the box 12.

The lock 68 may comprise a ball 70 and a biasing member 72. The biasing member 72 is positioned within an associated one of the end portions 60. The biasing member 72 biases the ball 70 outwardly from the associated end portion 60. Thus, the ball 70 frictionally engages the inner surface 66 thereby retaining the central portion 58 at the selected distance from the box. A door 74 is hingedly coupled to the box 12. The door 74 may be positioned on the first lateral side 26 such that the door 74 selectively closes the box 12.

In use, the hoop 54 is positioned around the user's neck 56. The hoop 54 is manipulated on the end portions 60 to position the box 12 a selected position on the user's chest 14. The object 18 is positioned on the top wall 20. The legs 42 are urged inwardly and the legs 42 are manipulated to extend into the wells 34 until the arms 48 frictionally engage the object 18. The legs 42 are released and the teeth 52 engage the grips 38 in the wells 34. Thus, the stand 40 retains the object 18 on the box 12. The object 18 is viewed while the user 16 is seated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hands free reading assembly comprising:
a box being configured to be positioned on a chest of a user while the user is seated, said box being configured to have an object being positioned thereon thereby facilitating the object to be visible to the user, said box having a pair of wells and a top wall;
a stand being removably coupled to said box wherein said stand is configured to retain the object in an upright position, said stand comprising a pair of legs and a central portion extending between said legs, said legs being spaced apart from each other, each of said legs having a distal end with respect to said central portion, said central portion including a pair of arms and a loop extending between said arms, said arms being spaced apart from each other, each of said arms being oriented perpendicular with respect to an associated one of said legs, said loop being spaced from each of said legs, said loop being oriented parallel to each of said legs, each of said legs having a plurality of teeth extending outwardly from an associated one of said legs, said distal end of each of said legs being removably insertable into an associated one of said wells such that each of said arms is spaced from said top wall of said box, each of said legs being biased outwardly with respect to said central portion such that said teeth on said associated leg engage said grips in said associated well; and
a hoop being hingedly coupled to said box wherein said hoop is configured to be positioned around a neck of the user thereby facilitating said box to be retained on the user's chest.

2. The assembly according to claim 1, wherein said box has a back wall, a front wall and a first lateral wall, said back wall extending upwardly beyond said top wall, said back wall having a distal edge with respect to said top wall, said first lateral wall being open to access an interior of said box wherein said box is configured to store items, said top wall being configured to have the object positioned thereon such said back wall retains the object in an upright position.

3. The assembly according to claim 2, wherein said pair of wells is positioned in said distal edge extending toward said top wall, said wells being spaced apart from each other, each of said wells having a bounding surface, said bounding surface of each of said wells being textured to define a plurality of grips extending along each of said wells.

4. The assembly according to claim 1, wherein each of said legs is positionable at a selected point within each of said wells such that said arms are spaced a selected distance from said top wall wherein each of said arms is configured to frictionally engage the object thereby retaining the object on said box, said loop being configured to frictionally engage the object thereby inhibiting the object from falling forwardly with respect to said back wall of said box.

5. The assembly according to claim 1, wherein:
said box has a front wall; and
said hoop comprises a central portion and a pair of end portions, each of said end portions being slidably coupled to said central portion, each of said end portions having a distal end with respect to said central portion, said distal end corresponding to each of said end portions being hingedly coupled to said front wall of said box such that said hoop is positionable at a selected angle with respect to said front wall.

6. The assembly according to claim 5, wherein each of said end portions has a lock being coupled thereto, said lock corresponding to each of said end portions frictionally engaging said central portion such that said central portion is spaced a selected distance from said box.

7. The assembly according to claim 2, further comprising a door being hingedly coupled to said box, said door being positioned on said first lateral side such that said door selectively closes said box.

8. A hands free reading assembly comprising:
a box being configured to be positioned on a chest of a user while the user is seated, said box being configured to have an object being positioned thereon thereby facilitating the object to be visible to the user, said box having a top wall, a back wall, a front wall and a first lateral wall, said back wall extending upwardly beyond said top wall, said back wall having a distal edge with respect to said top wall, said first lateral wall being open to access an interior of said box wherein said box is configured to store items, said top wall being configured to have the object positioned thereon such said back wall retains the object in an upright position, said distal edge having a pair of wells extending toward said top wall, said wells being spaced apart from each other, each of said wells having a bounding surface, said bounding surface of each of said wells being textured to define a plurality of grips extending along each of said wells;

a stand being removably coupled to said box wherein said stand is configured to retain the object in an upright position, said stand comprising a pair of legs and a central portion extending between said legs, said legs being spaced apart from each other, each of said legs having a distal end with respect to said central portion, said central portion including a pair of arms and a loop extending between said arms, said arms being spaced apart from each other, each of said arms being oriented perpendicular with respect to an associated one of said legs, said loop being spaced from each of said legs, said loop being oriented parallel to each of said legs, each of said legs having a plurality of teeth extending outwardly from an associated one of said legs, said distal end of each of said legs being removably insertable into an associated one of said wells such that each of said arms is spaced from said top wall of said box, each of said legs being biased outwardly with respect to said central portion such that said teeth on said associated leg engage said grips in said associated well, each of said legs being positionable at a selected point within each of said wells such that said arms are spaced a selected distance from said top wall wherein each of said arms is configured to frictionally engage the object thereby retaining the object on said box, said loop being configured to frictionally engage the object thereby inhibiting the object from falling forwardly with respect to said back wall of said box;

a hoop being hingedly coupled to said box wherein said hoop is configured to be positioned around a neck of the user thereby facilitating said box to be retained on the user's chest, said hoop comprising a central portion and a pair of end portions, each of said end portions being slidably coupled to said central portion, each of said end portions having a distal end with respect to said central portion, said distal end corresponding to each of said end portions being hingedly coupled to said front wall of said box such that said hoop is positionable at a selected angle with respect to said front wall, each of said end portions having a lock being coupled thereto, said lock corresponding to each of said end portions frictionally engaging said central portion such that said central portion is spaced a selected distance from said box; and a door being hingedly coupled to said box, said door being positioned on said first lateral side such that said door selectively closes said box.

* * * * *